United States Patent
Jensen et al.

[15] 3,691,439
[45] Sept. 12, 1972

[54] CONTROL ARRANGEMENT FOR A THREE PHASE MOTOR WITH INTERMEDIATE D.C. REGULATION

[72] Inventors: Arne Jensen; Tom Kastrup Petersen, both of Nordborg, Denmark

[73] Assignee: Danfos A/S., Nordborg, Denmark

[22] Filed: Jan. 28, 1971

[21] Appl. No.: 110,666

Related U.S. Application Data

[63] Continuation of Ser. No. 792,744, Jan. 21, 1969, abandoned.

[52] U.S. Cl. ..................................318/227, 321/10
[51] Int. Cl. ..............................................H02d 5/40
[58] Field of Search ........321/10; 318/345, 227, 341; 323/22

[56] References Cited

UNITED STATES PATENTS

| | | |
|---|---|---|
| 3,353,080 | 11/1967 | Santelmann, Jr. ........321/10 X |
| 3,117,292 | 1/1964 | Bixby......................321/10 X |

*Primary Examiner*—J. D. Miller
*Assistant Examiner*—Robert J. Hickey
*Attorney*—Wayne B. Easton

[57] ABSTRACT

The invention relates to a motor control which comprises a D.C. voltage regulator and an inverted converter. The voltage regulator has a periodically actuatable switch and filter means are provided between the voltage regulator and the converter for smoothing the voltage from the regulator. A series arranged resistor and condenser are disposed in parallel to the condenser of the filter means for damping pulsations in the voltage regulator output which cause motor torque fluctuations.

5 Claims, 2 Drawing Figures

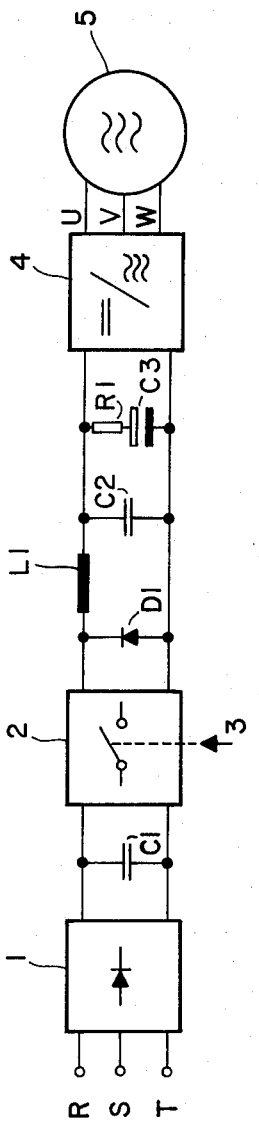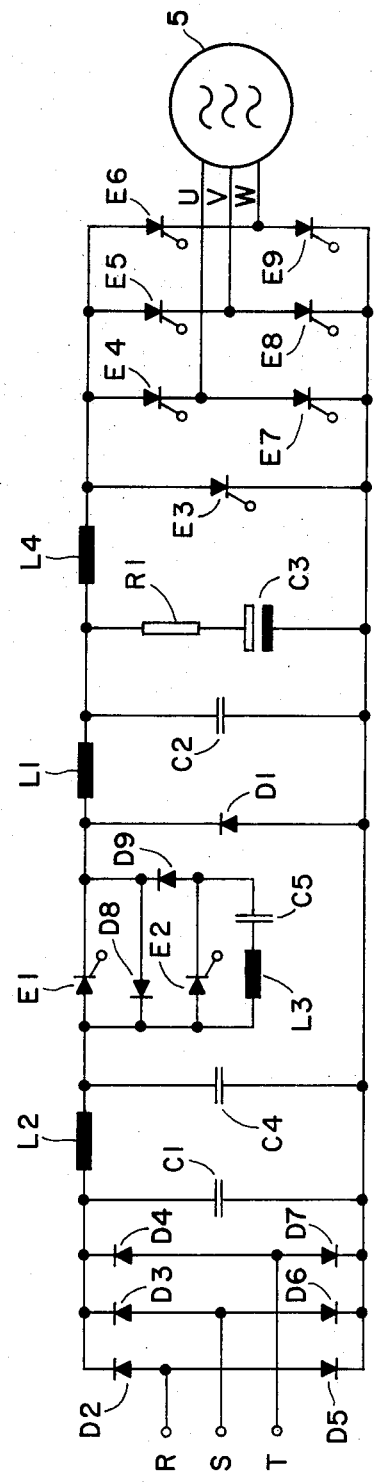

3,691,439

CONTROL ARRANGEMENT FOR A THREE PHASE MOTOR WITH INTERMEDIATE D.C. REGULATION

This is a continuation-in-part of U.S. Pat. application Ser. No. 792,744, filed Jan. 21, 1969, and now abandoned.

The invention relates to a control arrangement for a motor, powered by a regulable D.C. voltage through an inverted converter, the D.C. voltage regulator comprising a switch, contained in the D.C. voltage supply lead and actuated periodically in dependence upon the control factor, and behind said switch, a filter having a LC-element.

The filter smooths the D.C. voltage impulses, passed through by the switch, to a mean value. The magnitude of the mean value is dependent upon the relative "on" period of the switch. The switching frequency is in the order of 1,000 cycles, for example. In a known control arrangement, a shunt condenser is connected between a series choke and the output of the D.C. voltage regulator.

It has been found that in a control arrangement of this kind, the motor connected at the outlet side thereof does not run smoothly, particularly at low speeds. It appears to be alternatively accelerated and braked, although the D.C. voltage regulator maintains its setting.

The object of the invention is to impart smoother running to the motor.

According to the invention, this object is achieved by connecting a series arrangement of a condenser and a resistor in parallel with the filter condenser.

The fluctuations in the torque of the motor, which are obviously due to the switching frequency in the D.C. voltage regulator being imposed on the change-over frequency of the inverted converter, dependent upon the speed of the motor, and to the filter chain resonance, are balanced and damped out in this way. The second condenser balances out the differences in the capacity pick-up and delivery of the motor. It is important here that there should be connected in series with the second condenser a resistor which imparts to the series arrangement so great a time constant that the normal filtering process, adjusted to the switching frequency of the D.C. voltage regulator, is not interfered with, while on the other hand the fluctuations in speed, occurring at a lower frequency, can be followed. The resistor also contributes to improving the stability of the voltage regulation means, which normally receives the signal from the output voltage of the supply system, since it favorably influences the phase-displacement of the filter element.

A further advantage of the control arrangement resides in the fact that it offers greater safety when heavy overloading occurs (e.g. upon short-circuiting) behind the D.C. voltage regulator. Such short-circuiting can occur randomly; it can, however, also be caused by blocking or reverse-current braking. The use of the second condenser provides the possibility of keeping the filter condenser smaller, since part of its function can be taken over by the second condenser. A smaller filter condenser can, however, pass a short-circuit current only over a shorter period of time; the short-circuit current stemming from the second condenser is limited by the series resistor. Consequently, it is possible to use controllable semi-conductor rectifiers in the branches through which short-circuit current flows too, without the fear of their suffering damage by the short-circuit current.

In particular, the second condenser may have a multiple of, preferably roughly treble, the capacity of the filter condenser. The time-constant of the series arrangement should be in the order of 1.5 to 2.5 ms. This ensures that no substantial effect occurs in the D.C. voltage regulator as a result of actuating the switch, but that the fluctuations in the torque of the motor can be comfortably balanced out.

In a preferred embodiment, the filter condenser was rated at 120 $\mu$ F, the second condenser at 330 $\mu$ F and the resistor at 5 Ohms.

In particular, the second condenser may be an electrolytic condenser, since the internal heating up is limited by the current-limiting action of the resistor.

The invention will now be described in more detail by reference to an embodiment illustrated in the drawing, wherein:

FIG. 1 is a schematic illustration, and

FIG. 2 is a connection diagram for the control arrangement of the invention.

In FIG. 1, the phases R, S and T of a three-phase supply system are led into a rectifier control system 1, on the outlet side of which is connected a smoothing condenser C1. Beyond this is a D.C. voltage regulator 2, which, as indicated by the symbol, comprises a switch that is periodically actuated in dependence upon the control factor 3. A shunt rectifier D1, a series choke L1 and a shunt filter condenser C2 create a mean from the D.C. voltage chopped in this manner. A series arrangement comprising a second condenser C3 and a resistor R1 is connected in parallel with the filter condenser C2. The condenser C3 is an electrolytic condenser. The D.C. leads enter an inverted converter 4, the three output leads of which U, V and W run to a polyphase induction motor 5.

As shown in FIG. 2, the rectifier control arrangement may consist of a three-phase bridge rectifier, which comprises the rectifiers D2–D7. The smoothing condenser C1 is supplemented by a series choke L2 and a further shunt condenser C4.

The switch of the D.C. voltage regulator 2 is designed as a controllable rectifier E1, in parallel with which are a rectifier D8, a controllable rectifier E2 and a series arrangement comprising a condenser C5 and a rotary choke L3. Between the rectifiers D8 and E2 is a further rectifier D9. To open the switch, striking impulses are sent to the controllable rectifier E1, and for closing the switch the rectifier E2 receives striking impulses, which are hereinafter called "quenching impulses", since they lead to the quenching of the rectifier E1. As long as the rectifier E1 is closed, the condenser C5 can be charged. The rectifier E1 becomes conducting when a quenching impulse is received. This condition is stable until a quenching impulse occurs at the rectifier E2. As soon as the latter becomes conducting, the condenser C5 is recharged by way of the rotary choke L3 and produces a reverse voltage, which acts through the rectifier E1 and blocks it. At the same time, the quenching rectifier E2 is also blocked. The condenser C5 can then be charged afresh through the rectifiers D9 and D8 and, possibly, recharged somewhat from the D.C. supply system, so that it is again ready for use.

The control elements D1, L1, C2, C3 and R1 are the same as in FIG. 1.

A short-circuit choke L4 is connected in series with the inverted converter. This is followed by a controllable quenching rectifier E3. The inverted converter also incorporates six controllable rectifiers E4–E9, which are struck and quenched in the usual way. When the rectifier E3 cuts in, a short circuit occurs which quenches the rectifiers E4–E9 that are conducting at the time. The rectifier E3 can likewise be quenched about 20 μs after cutting in, by means of a quenching control arrangement, not illustrated.

A first control means is provided for the controllable rectifiers E1 and E2, and a second control means for the controllable rectifiers E3–E9. The first control means can be regulated in dependence upon the voltage required at the motor, and the second control means in dependence upon the required speed of the motor. It is also possible to join up the two in such manner that voltage and frequency are adjusted proportionally to each other, so that the magnetization of the motor and, thus, the torque at a given load remain approximately the same at each speed.

In operation, the condenser C1 or the filter element C1–L2–C4 smooths the voltage provided by the bridge rectifier 1. The filter element D1–L1–C2 smooths the voltage from the regulator 2. The series arrangement R1–C3 damps down pulsations in output, which are responsible for fluctuations in the torque of the motor 5, and takes over part of the filtering function of the condenser C2.

When short-circuiting occurs in the inverted converter, the condenser C2 can supply only a small current-time integral, on account of the low energy contained therein. Because of the resistor R1, connected in series, the condenser C3 responds only slowly, i.e. in the form of a short-circuit current limited by the resistor R1.

At a switching frequency of 1,000 cycles in the regulator 2 and for a motor-frequency regulation range of 0–100 cycles, the following data have been found to be particularly favorable:

Condenser C2 = 120 μF
Condenser C3 = 330 μF
Resistor R1 = 5 Ohms
Time constant R1–C3 = 1.9 ms

We claim:

1. In combination, a three phase electric motor and a control circuit connected to the motor for supplying a three-phase alternating current to the motor, comprising a full-wave diode rectifier circuit for developing a substantially direct current output in dependence upon a three-phase alternating current input, a voltage regulator connected to the output of the rectifier circuit having a series path including a semiconductor controlled rectifier; means to control the conduction of said semiconductor controlled rectifier to effect the required regulation; a filter circuit connected to the output of said voltage regulator having a series path including a choke coil, and a shunt path including a first condenser; a further shunt path in parallel with the output of said filter circuit which includes a resistor and a second condenser connected in series; the values of said resistor and second condensor being matched to said motor to damp out any tendency for the voltage supplied by said regulator to oscillate due to current feedback from said motor to said filter circuit, and a three-phase inverter connected between said shunt path and said motor having a plurality of semiconductor controlled rectifiers; and means to control the conduction of said semiconductor controlled rectifiers in said inverter to produce said three-phase alternating current which is supplied to said motor.

2. A control for a motor according to claim 1 wherein said second condenser has greater capacity than said filter condenser.

3. A control for a motor according to claim 2 wherein said second condenser has a capacity about three times greater than the capacity of said filter condenser.

4. A control for a motor according to claim 1 in which the time constant of said series arranged resistor and condenser is on the order of 1.5 to 2.5 ms.

5. A control for a motor according to claim 1 wherein said filter condenser is about 120 μF, said second condenser is about 330 μF, and said resistor is about 5 ohms.

* * * * *